United States Patent
Liu et al.

(10) Patent No.: US 8,606,044 B2
(45) Date of Patent: Dec. 10, 2013

(54) IMAGE PROCESSING APPARATUS AND IMAGE PROCESSING METHOD

(75) Inventors: Chih-Feng Liu, Hsinchu (TW); Po-Jung Lin, Hsinchu (TW); Da-Ming Chang, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 290 days.

(21) Appl. No.: 13/113,069

(22) Filed: May 22, 2011

(65) Prior Publication Data

US 2012/0219238 A1 Aug. 30, 2012

(30) Foreign Application Priority Data

Feb. 25, 2011 (TW) .............................. 100106510 A (51) Int. Cl.
G06K 9/36 (2006.01)
(52) U.S. Cl.
USPC .......................................... 382/291; 382/276
(58) Field of Classification Search
USPC ................. 382/276, 291, 293, 300, 305, 312; 345/649, 648; 375/240.18
See application file for complete search history.

(56) References Cited

U.S. PATENT DOCUMENTS

| 6,720,997 | B1 | 4/2004 | Horie et al. | |
| 7,228,006 | B2 * | 6/2007 | Stubler et al. | 382/286 |
| 7,324,706 | B2 * | 1/2008 | Bassi | 382/276 |
| 8,243,980 | B2 * | 8/2012 | Rhoads et al. | 382/100 |
| 8,280,196 | B2 * | 10/2012 | Magai et al. | 382/305 |
| 2006/0050074 | A1 | 3/2006 | Bassi | |

OTHER PUBLICATIONS

"Office Action of Taiwan Counterpart Application", issued on Sep. 16, 2013, p1-p5, in which the listed references were cited.

* cited by examiner

Primary Examiner — Kanjibhai Patel
(74) Attorney, Agent, or Firm — Jianq Chyun IP Office (57) ABSTRACT

An image processing apparatus includes a geometric position obtaining unit, an image retrieving unit, and an image rectifying unit. The geometric position obtaining unit receives a geometric transformation parameter, a block size, and a tile size, obtains a plurality of base-point coordinates of the geometric transformation parameter according to the block size and the tile size, and builds a base-point coordinate table according to the base-point coordinates. The image retrieving unit reads the base-point coordinate table, scans the base-point coordinate table according a fixed block size to generate a plurality of reference image ranges, and respectively retrieves a plurality of partial image data of a to-be-processed image data according to each of the reference image ranges. The image rectifying unit rectifies each of the partial image data according to the geometric transformation parameter.

9 Claims, 6 Drawing Sheets

IMAGE PROCESSING APPARATUS AND IMAGE PROCESSING METHOD

CROSS-REFERENCE TO RELATED APPLICATION

This application claims the priority benefit of Taiwan application serial no. 100106510, filed on Feb. 25, 2011. The entirety of the above-mentioned patent application is hereby incorporated by reference herein and made a part of this specification.

BACKGROUND OF THE INVENTION

1. Field of the Invention

The invention relates to an image processing apparatus and an image processing method. More particularly, the invention relates to an image processing apparatus that performs geometric transformation on images and an image processing method.

2. Description of Related Art

In the existing image processing technology, geometric transformation on images is often performed with use of geometric transform engine (GTE). The GTE can mostly be applied to lens distortion correction (LDC), rolling shutters of complementary metal oxide semiconductor (CMOS) image sensors, image rotation, and so on.

Due to the significant amount of the image data, when the GTE in the image processing apparatus reads the image data for image processing, the GTE can merely read partial image data each time from the main memory that stores the image data, and the GTE registers the partial image data in a cache for processing. According to the related art, a direct memory access (DMA) that retrieves the partial image data from the main memory can merely support the main memory with invariable capacity, and the DMA can merely access the main memory sequentially, such that a relatively large bandwidth for accessing the main memory is required. When the partial image data are stored into the cache, the memory capacity of the cache and the bandwidth are construed as limitations to image transformation. In light of the foregoing, the conventional image processing apparatus can perform image transformation to a limited extent.

SUMMARY OF THE INVENTION

The invention is directed to an image processing apparatus and an image processing apparatus, so as to dynamically adjust a range of partial image data of a to-be-processed image data and improve the efficacy of image processing.

In an embodiment of the invention, an image processing apparatus that includes a geometric position obtaining unit, an image retrieving unit, and an image rectifying unit is provided. The geometric position obtaining unit receives a geometric transformation parameter, a block size, and a tile size, obtains a plurality of base-point coordinates of the geometric transformation parameter according to the block size and the tile size, and builds a base-point coordinate table according to the base-point coordinates. The image retrieving unit is coupled to the geometric position obtaining unit for reading the base-point coordinate table, scanning the base-point coordinate table according a fixed block size to generate a plurality of reference image ranges, and respectively retrieving a plurality of partial image data of a to-be-processed image data according to each of the reference image ranges. The image rectifying unit is coupled to the image retrieving unit and the geometric position obtaining unit. Besides, the image rectifying unit rectifies each of the partial image data according to the geometric transformation parameter.

According to an embodiment of the invention, the image retrieving unit generates each of the reference image ranges based on a difference between a maximum coordinate and a minimum coordinate of the base-point coordinates in any fixed block size in the base-point coordinate table.

According to an embodiment of the invention, the image retrieving unit includes a DMA and a buffering memory. The DMA retrieves each of the partial image data of the to-be-processed image data based on each of the reference image ranges. The buffering memory is coupled to the DMA for registering each of the partial image data in the image retrieving unit.

According to an embodiment of the invention, the geometric position obtaining unit includes a digital signal processor.

According to an embodiment of the invention, the tile size is greater than the block size.

In an embodiment of the invention, an image processing method at least including following steps is provided. In the image processing method, a geometric transformation parameter, a block size, and a tile size are received. A plurality of base-point coordinates of the geometric transformation parameter are obtained based on the block size and the tile size, and a base-point coordinate table is built based on the base-point coordinates. The base-point coordinate table is read, and the base-point coordinate table is scanned according to a fixed block size to generate a plurality of reference image ranges. A plurality of partial image data of a to-be-processed image data are retrieved based on each of the reference image ranges. Each of the partial image data is rectified based on the geometric transformation parameter.

Based on the above, in the image processing apparatus described in the embodiments of the invention, the base-point coordinate table is built based on the geometric transformation parameter, the block size, and the tile size. Each reference image range for reading the partial image data of the to-be-processed image data is calculated by scanning the base-point coordinate table. Thereby, each reference image range of the to-be-retrieved partial image data can be dynamically adjusted, which can effectively save the memory space for memorizing the partial image data, reduce the reading times of dummy data, and improve the efficiency of the image processing apparatus.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
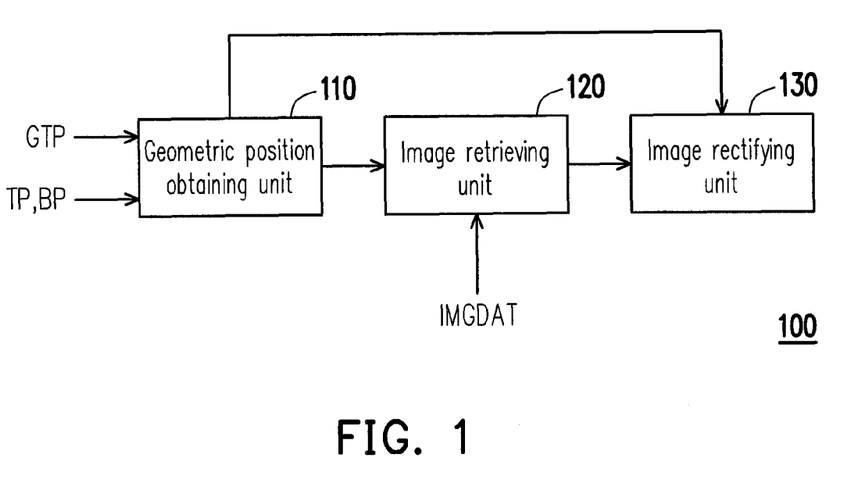
FIG. 1 is a schematic view illustrating an image processing apparatus according to an embodiment of the invention.

Please refer to FIG. 1. Specifically, FIG. 1 is a schematic view illustrating an image processing apparatus according to an embodiment of the invention. The image processing apparatus 100 includes a geometric position obtaining unit 110, an image retrieving unit 120, and an image rectifying unit 130. The geometric position obtaining unit 110 receives a geometric transformation parameter GTP, a block size BP, and a tile size TP. Here, the image processing apparatus 100 performs geometric transformations based on the geometric transformation parameter GTP. Besides, if the geometric transformation is performed on the image data, the tile size TP and the block size BP are determined. The block size BP is smaller than the tile size TP. For instance, when the tile size TP is set as 16×16, the block size BP can be set as 4×4. Namely, there are 16 blocks in one tile.

The geometric position obtaining unit 110 obtains a plurality of base-point coordinates of the geometric transformation parameter GTP based on the block size BP and the tile size TP received by the geometric position obtaining unit 110. According to the base-point coordinates, the geometric position obtaining unit 110 builds a base-point coordinate table. To elaborate how to build the base-point coordinate table, please refer to FIG. 2 which is a schematic view illustrating the way to build a base-point coordinate table according to an embodiment of the invention.

Figure 2:
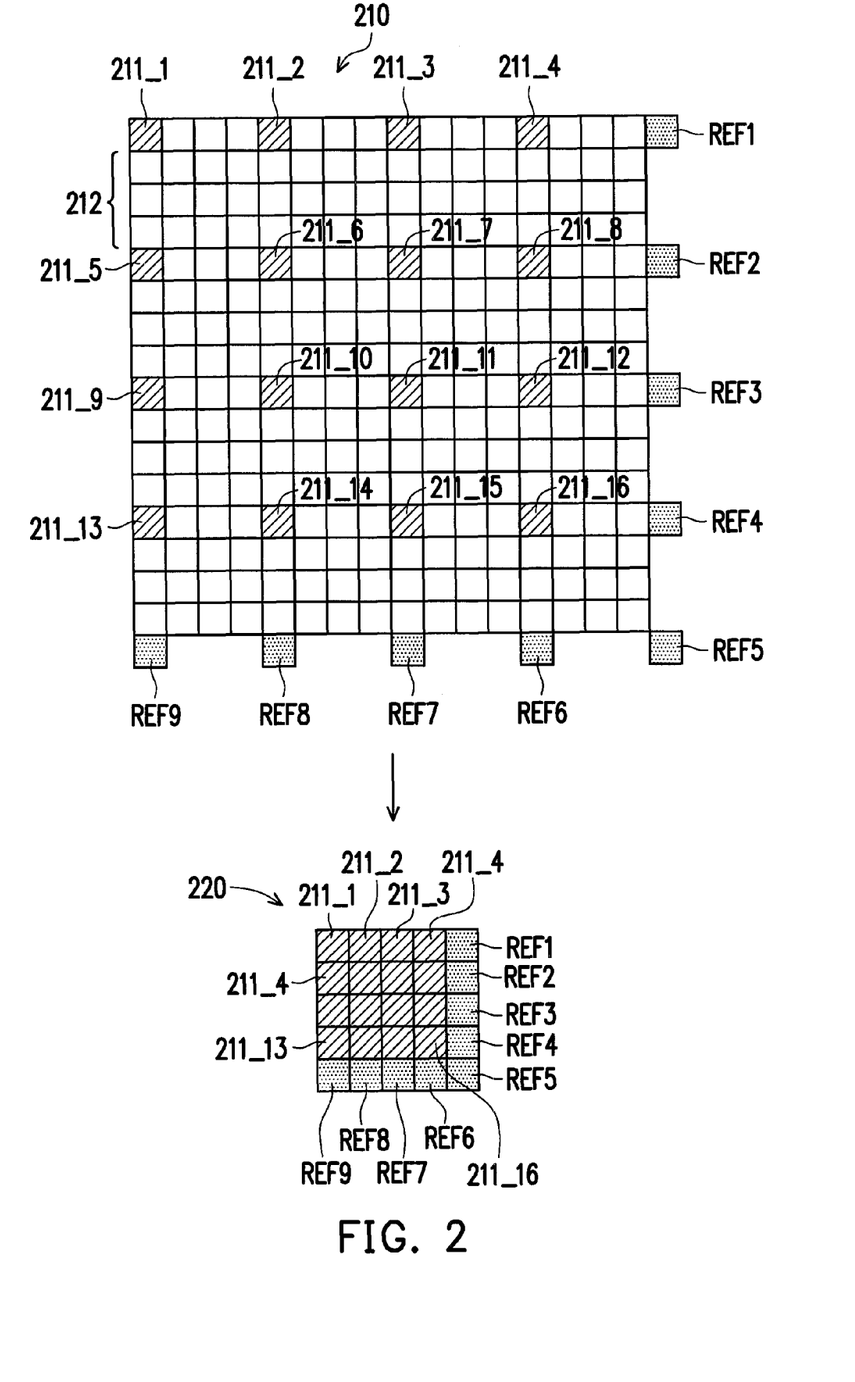
FIG. 2 is a schematic view illustrating the way to build a base-point coordinate table according to an embodiment of the invention.

In FIG. 2, the size of the tile 210 is set as 16×16, while the block size is set as 4×4. Any point (e.g., the upper-left point in FIG. 2) in each block in the tile 210 can be set as base points 211_1~211_16. The geometric position obtaining unit 110 then sets a plurality of reference points REF1~REF9 on the outer edge of the tile 210. The geometric position obtaining unit 110 associates the base points 211_1~211_16 with the reference points REF1~REF9 to obtain the base-point coordinate table 220.

Note that the non-base-point coordinates in the tile 210, e.g., coordinates of points in the region 212, can be obtained by interpolating base-point coordinates adjacent to the non-base-point coordinates. The reference points REF1~REF9 serve as reference base points for interpolation when the non-base-point coordinates on the edge of the tile 210 are calculated.

The base-point coordinate table 220 shown in FIG. 2 is obtained by compressing the tile 210. The base-point coordinate table 220 obtained through compression can effectively reduce the memory space required by the image processing apparatus 100. Undoubtedly, when the image processing apparatus 100 has sufficient memory space, it is not necessary to generate the base-point coordinate table 220 by compressing the tile 210. Namely, all of the coordinates in the entire tile 210 can be directly recorded, so as to correspondingly generate the base-point coordinate table 220.

Figure 3:
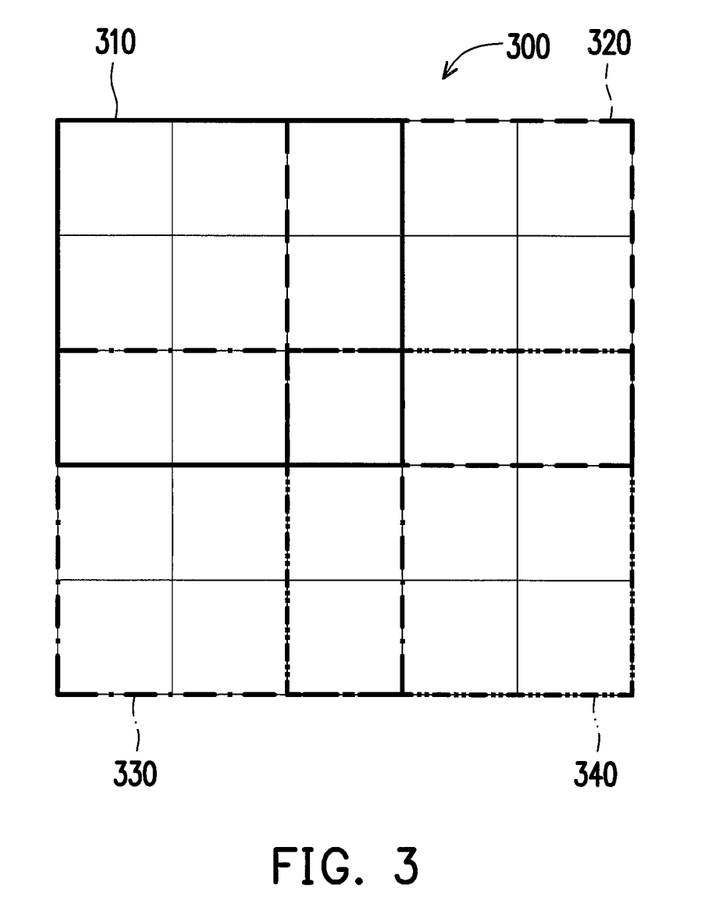
FIG. 3 is a schematic view illustrating the step of scanning the base-point coordinate table according to an embodiment of the invention.

With reference to FIG. 1, the image retrieving unit 120 is coupled to the geometric position obtaining unit 110 and receives a to-be-processed image data IMGDAT. The image retrieving unit 120 further reads the base-point coordinate table generated by the geometric position obtaining unit 110 and scans the base-point coordinate table according to a fixed block size. FIG. 3 is a schematic view illustrating the step of scanning the base-point coordinate table according to an embodiment of the invention. In this embodiment, the size of the base-point coordinate table 300 is 5×5, for instance. The image retrieving unit 120 can set the size of fixed blocks 310~340 as 3×3 and sequentially scan all the base-point coordinates in the base-point coordinate table 300 according to the size of the fixed blocks 310~340. It should be mentioned that the fixed blocks 310~340 are partially overlapped when the base-point coordinate table 300 is scanned. This is because the correlations between base points in the base-point coordinate table 300 can also be reflected by scanning the fixed blocks. The area of the overlapping portion between every two of the fixed blocks can be determined based on actual requirements.

With reference to FIG. 1, after the image retrieving unit 120 completely scans the base-point coordinate table, a plurality of reference image ranges can be correspondingly generated based on the results of scanning the base-point coordinate table. That is to say, when the image retrieving unit 120 scans the base-point coordinate table, a plurality of base-point coordinates can be obtained when the different fixed blocks in the base-point coordinate table are scanned. The image retrieving unit 120 defines each of the reference image ranges corresponding to one of the fixed blocks based on the maximum coordinate and the minimum coordinate of the base-point coordinates generated by scanning each of the fixed blocks. To make the invention more comprehensible to people having ordinary skill in the art, FIG. 4 is provided below to elaborate how to set the reference image ranges as set forth in the embodiments of the invention.

Figure 4:
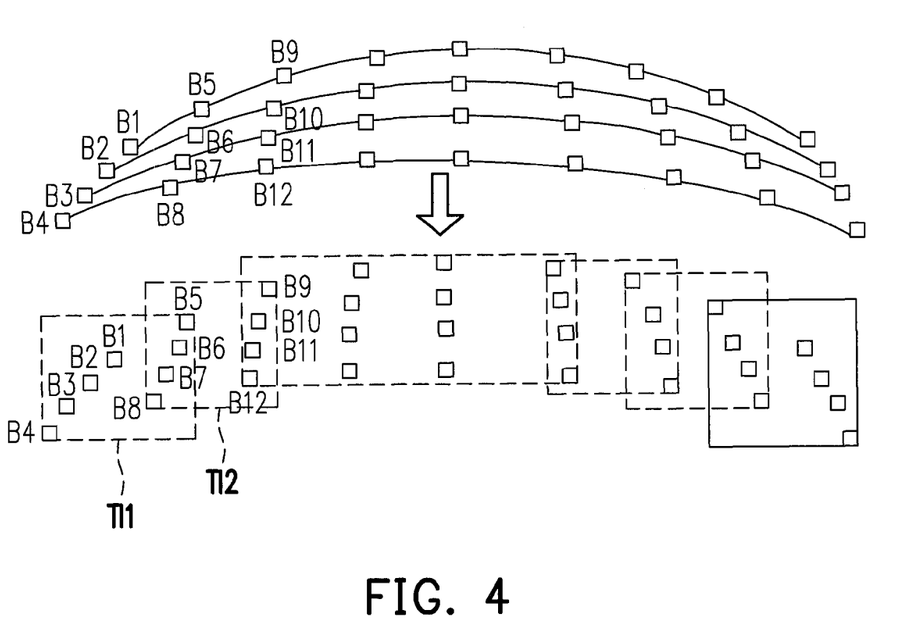
FIG. 4 is a schematic view illustrating the way to set reference image ranges according to an embodiment of the invention.

FIG. 4 is a schematic view illustrating the way to set reference image ranges according to an embodiment of the invention. The image retrieving unit 120 scans the fixed block TI1 to obtain the base-point coordinates B1~B8. The image retrieving unit 120 scans the fixed block TI2 to obtain the base-point coordinates B5~B12. It is assumed that the base-point coordinates B1~B8 are (23, 25), (20, 30), (16, 35), (12, 40), (33, 20), (30, 28), (27, 33), and (24, 38), respectively. Based on the above assumption, the maximum coordinate and the minimum coordinate of the horizontal axis (the x axis) are 33 and 12, respectively, and the maximum coordinate and the minimum coordinate of the vertical axis (the y axis) are 40 and 20, respectively. Hence, the image retrieving unit 120 can set the reference image range of the corresponding fixed block TI1 as 21×20 based on the difference between the maximum coordinate and the minimum coordinate of the x axis and the y axis.

In addition, when the reference image range of the corresponding fixed block TI2 is set, the coordinates of the base points B9~B12 are assumed to be (42, 16), (38, 23), (33, 28), and (27, 34), respectively. Based on the above assumption, in the coordinates of the base points B5~B12, the maximum coordinate and the minimum coordinate of the horizontal axis (the x axis) are 42 and 24, respectively, and the maximum coordinate and the minimum coordinate of the vertical axis (the y axis) are 38 and 16, respectively. Hence, the image retrieving unit 120 can set the reference image range of the corresponding fixed block TI2 as 18×22 based on the difference between the maximum coordinate and the minimum coordinate of the x axis and the y axis.

According to the above description, the reference image range described in the embodiments of the invention can be dynamically adjusted. That is to say, since the base-point coordinates are variable, the reference image range can be correspondingly modulated based on the variable base-point coordinates.

Figure 5:
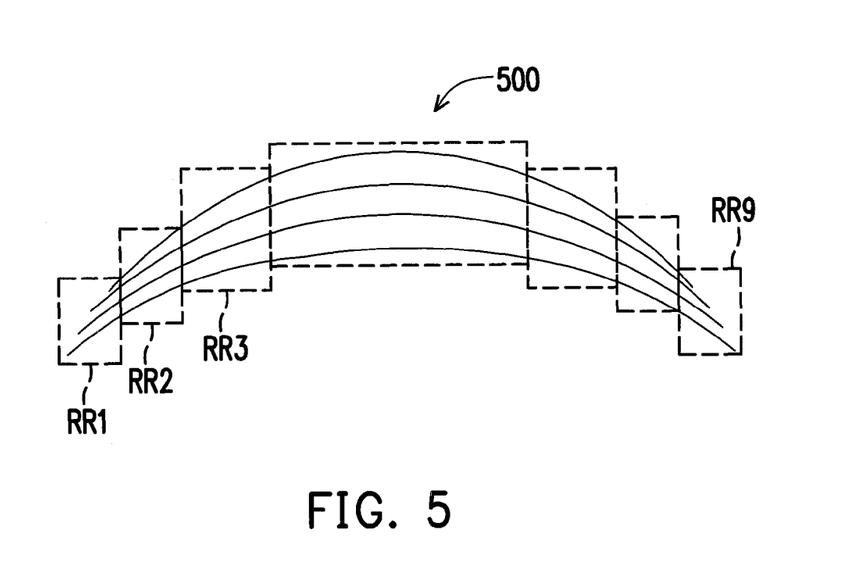
FIG. 5 is a schematic view illustrating an image retrieving unit 120 that retrieves a to-be-processed image data.

With reference to FIG. 1, after the image retrieving unit 120 obtains a plurality of reference image ranges, the image retrieving unit 120 can retrieve a plurality of partial image data of the to-be-processed image data based on each of the reference image ranges. As shown in FIG. 5, the image retrieving unit 120 sequentially retrieves each of the partial image data of the to-be-processed image data 500 based on different reference image ranges RR1~RR9. As such, the to-be-processed image data 500 can be efficiently retrieved, and the performance of the image processing apparatus can be improved.

The image rectifying unit 130 is coupled to the image retrieving unit 120 and the geometric position obtaining unit 110. Based on the geometric transformation parameter provided by the geometric position obtaining unit 110, the image rectifying unit 130 rectifies each of the partial image data provided by the image retrieving unit 120.

Figure 6A:
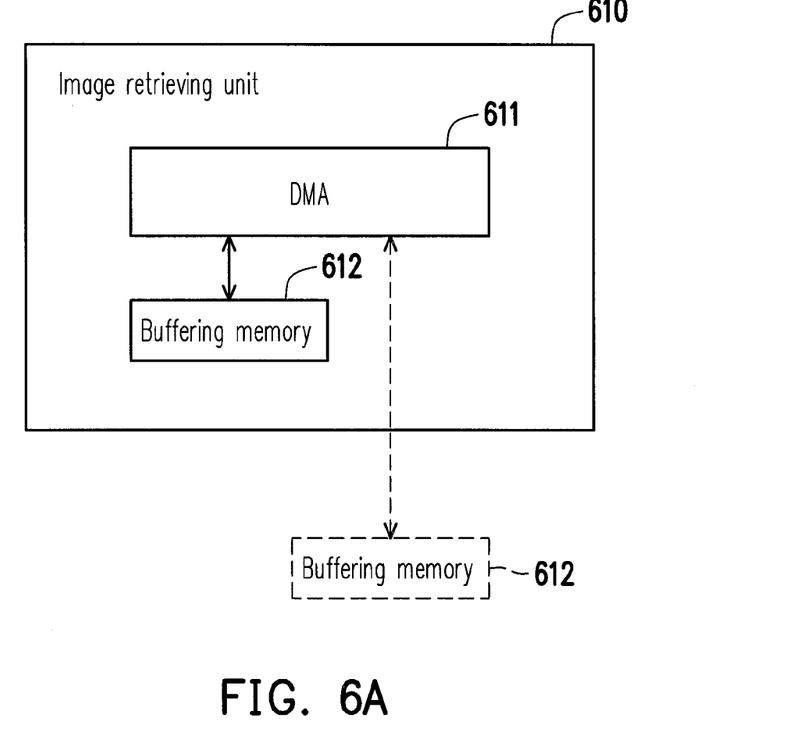
FIG. 6A is a schematic view illustrating the way to carry out the image retrieving unit according to an embodiment of the invention.
Figure 6B:
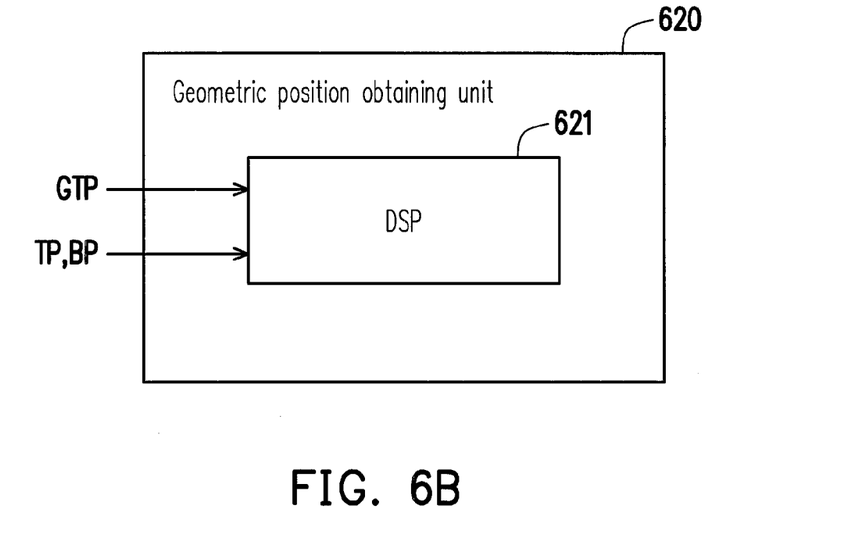
FIG. 6B is a schematic view illustrating the way to carry out the geometric position obtaining unit according to an embodiment of the invention.

Please refer to FIG. 6A and FIG. 6B. Specifically, FIG. 6A is a schematic view illustrating the way to carry out the image retrieving unit according to an embodiment of the invention. FIG. 6B is a schematic view illustrating the way to carry out the geometric position obtaining unit according to an embodiment of the invention. As indicated in FIG. 6A, the image retrieving unit 610 includes a DMA 611 and a buffering memory 612. The DMA 611 retrieves each of the partial image data of the to-be-processed image data based on each of the reference image ranges. The buffering memory 612 is coupled to the DMA 611. Besides, the buffering memory 612 registers each of the partial image data in the image retrieving unit 611. Note that the buffering memory 612 can be built in the image retrieving unit 610 or added to the image retrieving unit 610, such that the DMA 611 can access the buffering memory 612.

As shown in FIG. 6B, the geometric position obtaining unit 620 includes a digital signal processor (DSP) 621 that receives the geometric transformation parameter GTP, the block size BP, and the tile size TP. A plurality of base-point coordinates of the geometric transformation parameter GTP are obtained based on the block size BP and the tile size TP, and a base-point coordinate table is built based on the base-point coordinates.

Figure 7:
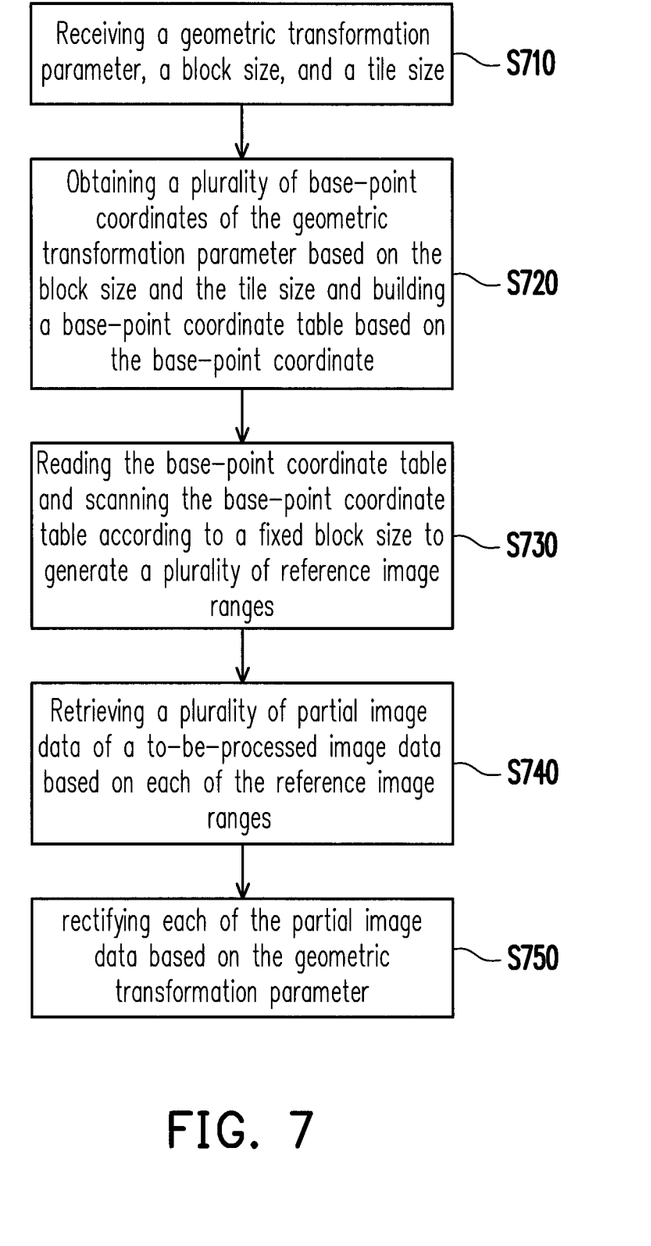
FIG. 7 is a flowchart illustrating an image processing method according to another embodiment of the invention.

Please refer to FIG. 7. Specifically, FIG. 7 is a flowchart illustrating an image processing method according to another embodiment of the invention. According to the image processing method described in this embodiment, in step S710, a geometric transformation parameter, a block size, and a tile size are received. In step S720, a plurality of base-point coordinates of the geometric transformation parameter are obtained according to the block size and the tile size, and a base-point coordinate table is built according to the base-point coordinates. After the base-point coordinate table is built, the base-point coordinate table is read and scanned based on a fixed block size to generate a plurality of reference image ranges in step S730. In step S740, a plurality of partial image data of a to-be-processed image are retrieved based on each of the reference image ranges. In step S750, each of the partial image data is rectified based on the geometric transformation parameter.

The details of each step in this embodiment are elaborated in the previous embodiments of the image processing apparatus and thus are not reiterated herein.

In light of the foregoing, the base-point coordinate table can be built by obtaining the base-point coordinates in the tile, and the reference image ranges can be obtained by scanning the base-point coordinate table. When the geometric transformation of the to-be-processed image data is performed, each partial data image of the to-be-processed image data can be sequentially read according to the variable reference image range, such that the image rectifying unit can rectify the partial image data. As such, the image processing apparatus described in the embodiments of the invention can efficiently retrieve the required image data, reduce the reading amount of dummy data, and improve the efficiency of image processing.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. An image processing apparatus comprising:
    a geometric position obtaining unit receiving a geometric transformation parameter, a block size, and a tile size, obtaining a plurality of base-point coordinates of the geometric transformation parameter according to the block size and the tile size, and building a base-point coordinate table according to the base-point coordinates, wherein, each of a plurality of base-points is one point of each of the blocks in a tile;
    an image retrieving unit coupled to the geometric position obtaining unit, the image retrieving unit reading the base-point coordinate table, scanning the base-point coordinate table according a fixed block size to generate a plurality of reference image ranges, and respectively retrieving a plurality of partial image data of a to-be-processed image data according to each of the reference image ranges; and
    an image rectifying unit coupled to the image retrieving unit and the geometric position obtaining unit, the image rectifying unit rectifying each of the partial image data according to the geometric transformation parameter.

2. The image processing apparatus as claimed in claim 1, wherein the image retrieving unit generates each of the reference image ranges based on a difference between a maximum coordinate and a minimum coordinate of the base-point coordinates in any one of the fixed block sizes in the base-point coordinate table.

3. The image processing apparatus as claimed in claim 1, wherein the image retrieving unit comprises:
    a direct memory access for retrieving each of the partial image data of the to-be-processed image data based on each of the reference image ranges; and
    a buffering memory coupled to the direct memory access for registering each of the partial image data in the image retrieving unit.

4. The image processing apparatus as claimed in claim 1, wherein the geometric position obtaining unit comprises a digital signal processor.

5. The image processing apparatus as claimed in claim 1, wherein the tile size is greater than the block size.

6. An image processing method comprising:
    receiving a geometric transformation parameter, a block size, and a tile size;
    obtaining a plurality of base-point coordinates of the geometric transformation parameter based on the block size and the tile size and building a base-point coordinate table based on the base-point coordinates, wherein, each of a plurality of base-points is one point of each of the blocks in a tile;

reading the base-point coordinate table and scanning the base-point coordinate table according to a fixed block size to generate a plurality of reference image ranges;

retrieving a plurality of partial image data of a to-be-processed image data based on each of the reference image ranges; and rectifying each of the partial image data based on the geometric transformation parameter.

7. The image processing method as claimed in claim 6, the step of scanning the base-point coordinate table according to the fixed block size to generate the reference image ranges comprising:

generating each of the reference image ranges based on a difference between a maximum coordinate and a minimum coordinate of the base-point coordinates in any one of the fixed block sizes in the base-point coordinate table.

8. The image processing method as claimed in claim 6, further comprising:

registering each of the partial image data in a buffering memory.

9. The image processing method as claimed in claim 6, wherein the tile size is greater than the block size.

\* \* \* \* \*